United States Patent [19]

Ito

[11] Patent Number: 4,599,504

[45] Date of Patent: Jul. 8, 1986

[54] INDUCTION HEATING APPARATUS WITH PROTECTION AGAINST POWER INTERRUPTION

[75] Inventor: Susumu Ito, Nagoya, Japan

[73] Assignee: Kabushiki Kaisha Toshiba, Kawasaki, Japan

[21] Appl. No.: 688,160

[22] Filed: Dec. 31, 1984

[30] Foreign Application Priority Data

Jul. 26, 1984 [JP] Japan ................... 59-156068

[51] Int. Cl.$^4$ .................. H05B 6/12; H05B 6/06
[52] U.S. Cl. .................. 219/10.77; 219/10.49 R; 363/97; 363/46; 361/90; 323/299
[58] Field of Search .......... 219/10.77, 10.75, 10.49 R; 323/299, 300, 301; 363/95, 97, 98, 37, 46; 361/90, 91, 92

[56] References Cited

U.S. PATENT DOCUMENTS

| | | | |
|---|---|---|---|
| 3,921,058 | 11/1975 | Tanaka et al. | 323/300 |
| 4,011,499 | 3/1977 | Betsill et al. | 323/301 |
| 4,352,000 | 9/1982 | Fujishima et al. | 219/10.77 |
| 4,438,311 | 3/1984 | Tazima et al. | 219/10.49 R |

FOREIGN PATENT DOCUMENTS

53-143929 12/1978 Japan .

*Primary Examiner*—Philip H. Leung
*Attorney, Agent, or Firm*—Cushman, Darby and Cushman

[57] ABSTRACT

According to the present invention, an induction heating apparatus comprises a rectifying circuit for rectifying an AC voltage from an AC power source, an inverter circuit for converting a DC output from the rectifying circuit to a high frequency current and supplying it to a heating coil, a circuit for detecting a fluctuation in the AC power source through a low voltage converting section coupled to the AC power source, this detecting circuit having a detection characteristic which can hold the detecting state for at least a constant time, and a controlling circuit for controlling the inverter circuit in the stopped state or driving state in accordance with the presence or absence of a detection output from the circuit for detecting the fluctuation in the AC power source voltage.

3 Claims, 4 Drawing Figures

INDUCTION HEATING APPARATUS WITH PROTECTION AGAINST POWER INTERRUPTION

BACKGROUND OF THE INVENTION

This invention relates generally to an induction heating apparatus and, more particularly, to an induction-heating cooking apparatus for performing cooking due to induction heating in which safety and reliability are improved.

FIG. 1 shows an induction heating-cooking apparatus in which a high frequency magnetic field is generated from a heating coil and applied to a cooking pan as a load, Eddy currents are caused in the pan, and heat cooking due to the self-exothermic character of the pan on the basis of the eddy current loss is performed. An apparatus with such an arrangement as shown in FIG. 1 has been conventionally known. That is, this apparatus is a kind of induction heating apparatus, and the principle of induction heating is applied to a cooking apparatus.

In FIG. 1, reference numeral 15 denotes a main body of a cooking apparatus, and a top plate 16 for mounting a cooking pan is attached on the top surface of the main body 15. A base cabinet 17 is formed on the side surfaces of the main body 15. A power switch 2 and a heating power setting knob 18 are provided in the base cabinet 17. Numeral 19a is a power cord and 19b is a power plug.

FIG. 2 shows a control circuit enclosed in the prior art cooking apparatus main body. In FIG. 2, numeral 1 indicates a commercial AC power source, and a rectifying circuit 3 is connected to the power source 1 through the power switch 2. The rectifying circuit 3 comprises a diode bridge 4, a choke coil 5 and a smoothing capacitor 6. A series resonance circuit consisting of a heating coil 7 and a resonance capacitor 8 is connected to an output terminal of the rectifying circuit 3. The heating coil 7 is arranged in a manner such that it faces and is away from the back surface of the top plate 16, mounted on the top surface of the cooking apparatus main body. The collector-emitter of an npn transistor (power transistor) 9, serving as a switching element, is connected in parallel to the resonance capacitor 8, and a damper diode 10 is also connected in parallel thereto. That is, an inverter circuit for exciting the above resonance circuit is constituted by the rectifying circuit 3, transistor 9, damper diode 8, and a driving circuit mentioned later, etc. The base of the transistor 9 is connected to a driving circuit 11, and the transistor 9 is turned on or off by the driving circuit 11, namely, the inverter circuit is made operative by the driving circuit 11, thereby allowing the resonance circuit to be excited. DC power supplying circuit 20, serving as what is called an auxiliary power source, is connected between the connecting points of the prior art power switch 2 and rectifying circuit 3. The DC power supplying circuit 20 supplies DC voltage for the operation to the driving circuit 11 constituting the inverter circuit, an oscillation controlling circuit 40, an on-off duty ratio determining circuit 50 and a circuit 60 for detecting a fluctuation in the AC power source, which will be explained later, etc. Further, a current transformer 30 is provided between the connecting points of the power switch 2 and rectifying circuit 3. The output of the current transformer 30 is supplied to the oscillation controlling circuit 40. The oscillation controlling circuit 40 has a function to detect the presence or absence and material of the load, i.e., cooking pan, in response to the output of the current transformer 30. When the load is proper, the circuit 40 outputs a power setting signal A at a level corresponding to a set value of a heating power setting volume 41 (which is interlocked with the heating power setting knob 18). At the same time, the circuit 40 outputs a saw wave signal B synchronized with the timing of the oscillation of the foregoing resonance circuit through a transformer 12 for extracting the voltage across the heating coil 7.

On the other hand, the on-off duty ratio determining circuit 50 comprises: a series member of resistors 51 and 52 to which a DC voltage +Vdd is applied; an npn transistor 54 whose base-emitter is connected to the resistor 52 through a resistor 53 and whose collector is connected to the driving circuit 11; a series member of a resistor 55 and a capacitor 56 to which the DC voltage +Vdd is applied; a resistor 57 connected in parallel to the capacitor 56; and a comparator (operational amplifier) 58 in which the voltage developed at a mutual connected point of the resistors 55 and 57 and capacitor 56 is supplied to a non-inverting input terminal (+), and an output terminal is connected to a mutual connecting point of the resistors 51 and 52. The power setting signal A is supplied from the oscillation controlling circuit 40 to a mutual connecting point of the resistors 55 and 57 and capacitor 56. Further, the saw wave signal B is supplied from the oscillation controlling circuit 40 to an inverting input terminal (−) of the comparator 58.

The circuit 60 for detecting a fluctuation in the AC power source comprises: a series member of resistors 61 and 62 to which the voltage across the smoothing capacitor 6 in the rectifying circuit 3 is applied; a series member of resistors 63 and 64 to which the DC voltage +Vdd is applied to an npn transistor 65 whose base-emitter is connected to the resistor 62 and whose collector is connected to a mutual connecting point of the resistors 63 and 64; and an npn transistor 66 whose base-emitter is connected to a mutual connecting point of the resistors 63 and 64 and whose collector is connected to a mutual connecting point of the resistors 55 and 57 and capacitor 56 in the on-off duty ratio determining circuit 50.

Therefore, when a cooking pan 70 is placed on the top plate 16 and the power switch 2 is turned on, the voltage across the smoothing capacitor 6 in the rectifying circuit 3 increases. In the circuit 60 for detecting a fluctuation in the AC power source, when the voltage at the mutual connecting point of the resistors 61 and 62 reaches a predetermined level, the transistor 65 is turned on. When the transistor 65 is turned on, the transistor 66 is turned off. On the other hand, in the on-off duty ratio determining circuit 50, the transistor 66 is turned off, so that the capacitor 56 is charged in response to the power setting signal A from the oscillation controlling circuit 40, causing the noninverting input voltage to the comparator 58 to be increased. In this way, the voltage at the level corresponding to the power setting signal A and the voltage of the saw wave signal B are compared by the comparator 58. The transistor 54 is turned on or off in accordance with the results of the comparison. In this case, when the level of the power setting signal A is higher, the on-off duty ratio of the transistor 54 also becomes high (on-duration becomes long). When the level of the power setting signal A is lower, the on-off duty ratio of the transistor 54 also becomes low (on-duration becomes short). The driving circuit 11 drives and turns on or off the transistor 9 synchronously with the on-off operation of the transistor 54. When the transistor 9 is turned on or off, the resonance circuit oscillates in association with this on-off operation, so that a high frequency current flows through the heating coil 7. In this way, the high frequency magnetic field is generated from the heating coil 7 and is given to the pan 70, so that the eddy current is developed in the pan 70, and the pan 70 generates the heat by itself due to the eddy current loss.

On the other hand, when the power source voltage drops for some reason such as in the case where the user erroneously turns off the power switch 2 during the cooking operation and immediately turns it on afterwards, where defective contact of the power plug 19b occurs, or where instantaneous power failure of the power source itself occurs, etc., the voltage of the smoothing capacitor 6 in the rectifying circuit 3 decreases in response to the voltage drop. When the voltage of the smoothing capacitor 6 becomes less than a predetermined level, the transistor 65 in the circuit 60 for detecting a fluctuation in the AC power source is turned off, causing the transistor 66 to be turned on. When the transistor 66 is turned on, the discharge path of the capacitor 56 in the on-off duty ratio determining circuit 50 is formed, and the non-inverting input voltage level to the comparator 58 becomes zero. As described above, the output level of the comparator 58 becomes low irrespective of the operation of the oscillation controlling circuit 40, and the transistor 54 maintains the off state. The transistor 9 is also turned off in association with turning off the transistor 54, so that the operation of the inverter circuit is stopped, the high frequency current does not flow through the heating coil 7, and the cooking heat is interrupted. When the power source voltage is normally recovered and the voltage of the smoothing capacitor 6 increases, the cooking heat is restarted.

Namely, the oscillation controlling circuit 40 allows the continuation of the operation irrespective of the drop in power voltage, due to the stored voltage capacity of the capacitor in the DC power supplying circuit 20. The circuit 60 for detecting a fluctuation in the AC power source is provided, and the on-off driving of the transistor 9 is immediately stopped by circuit 60 when the power voltage drops. Thus, the operation of the inverter circuit is stopped, thereby preventing the unstable operation of the inverter circuit.

However, since there is a high impedance on the output side of the rectifying circuit 3 when the transistor 9 is turned off, there is a problem that the voltage of the smoothing capacitor 6 does not drop immediately even when the power voltage decreases due to the small load thereacross.

In other words, even when the power voltage drops, if this voltage-drop occur when transistor 9, is off the on-off driving of the transistor 9 will be continued if the output voltage of the DC power supplying circuit 20 does not drop and the operation of the oscillation controlling circuit 40 does not stop. Consequently, the unstable operation of the inverter circuit cannot be always prevented.

Although such continuation of the on-off driving of the transistor 9 is undesirable, when the transistor 9 is turned on due to this continuation of operation, the impedance on the output side of the rectifying circuit 3 becomes low. Therefore, the voltage of the smoothing capacitor 6 certainly drops due to the higher load across capacitor 6. Therefore, depending on the power voltage drop at that time, the on-off driving of the transistor 9 is quickly stopped. Namely, the unstable operation of the inverter circuit can be stopped as the temporary operation.

However, if the user repeats the on-off operation of the power switch 2 many times, or if the power voltage repeatedly fluctuates for a long time due to a defective contact or the like of the power plug 19b, the DC power supplying circuit 20 cannot maintain the operating voltage of the oscillation controlling circuit 40. Thus, operation of the oscillation controlling circuit 40 itself, as the principal part for the control, becomes unstable. When the on-off driving of the transistor 9 continues as mentioned above under such a situation, the operation of the transistor 9 itself becomes unstable. Thus, this causes risks of not only the unstable operation of the inverter circuit but also the breakage of the transistor 9.

On one hand, although the circuit 60 for detecting a fluctuation in the AC power source is inherently a low voltage circuit, it is connected to the inverter circuit as the high voltage circuit. Therefore, parts having high withstanding voltages have to be used as the parts of the detecting circuit 60, so that this also causes a problem of an increase in cost. Further, if parts of the inverter circuit are broken, this breakage will affect the circuit 60 for detecting a fluctuation in the AC power source, causing a risk such that parts of the detecting circuit 60 will have been also broken.

SUMMARY OF THE INVENTION

It is, therefore, an object of the present invention to provide a new and improved induction heating apparatus in which, when the power voltage fluctuates, the unstable operation of a controlling circuit including an inverter circuit can be prevented, and the breakage of parts of the controlling circuit including the inverter circuit can be prevented, thereby enabling excellent safety and reliability to be presented.

According to the present invention, an induction heating apparatus comprises: a rectifying circuit for rectifying an AC voltage from an AC power source; an inverter circuit for converting a DC output from the rectifying circuit to a high frequency current and supplying it to a heating coil; a circuit for detecting a fluctuation in the AC power source voltage through a low voltage converting section coupled to the AC power source, this detecting circuit having a detection characteristic which can hold the detecting state for at least a constant time; and control means for controlling the inverter circuit in the stopped state or driving state in accordance with the presence or absence of a detection output from the circuit for detecting a fluctuation in the AC power source voltage.

BRIEF DESCRIPTION OF THE DRAWINGS

These and other objects and features of the present invention can be understood by reference to the accompanying drawings, in which.

DETAILED DESCRIPTION OF THE PREFERRED EMBODIMENT

Figure 1:
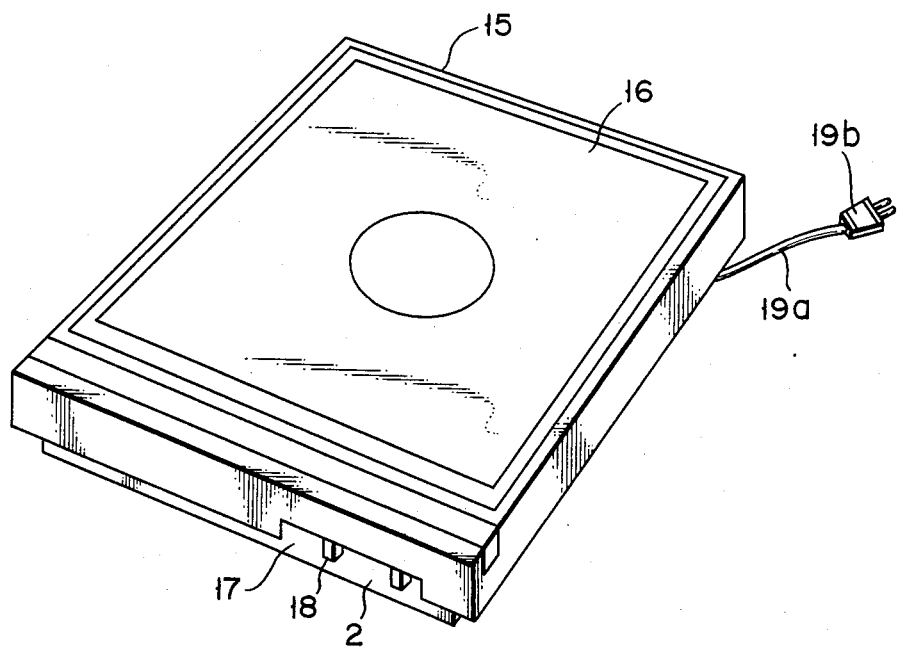
FIG. 1 is an external perspective view showing an induction heating cooking apparatus.
Figure 2:
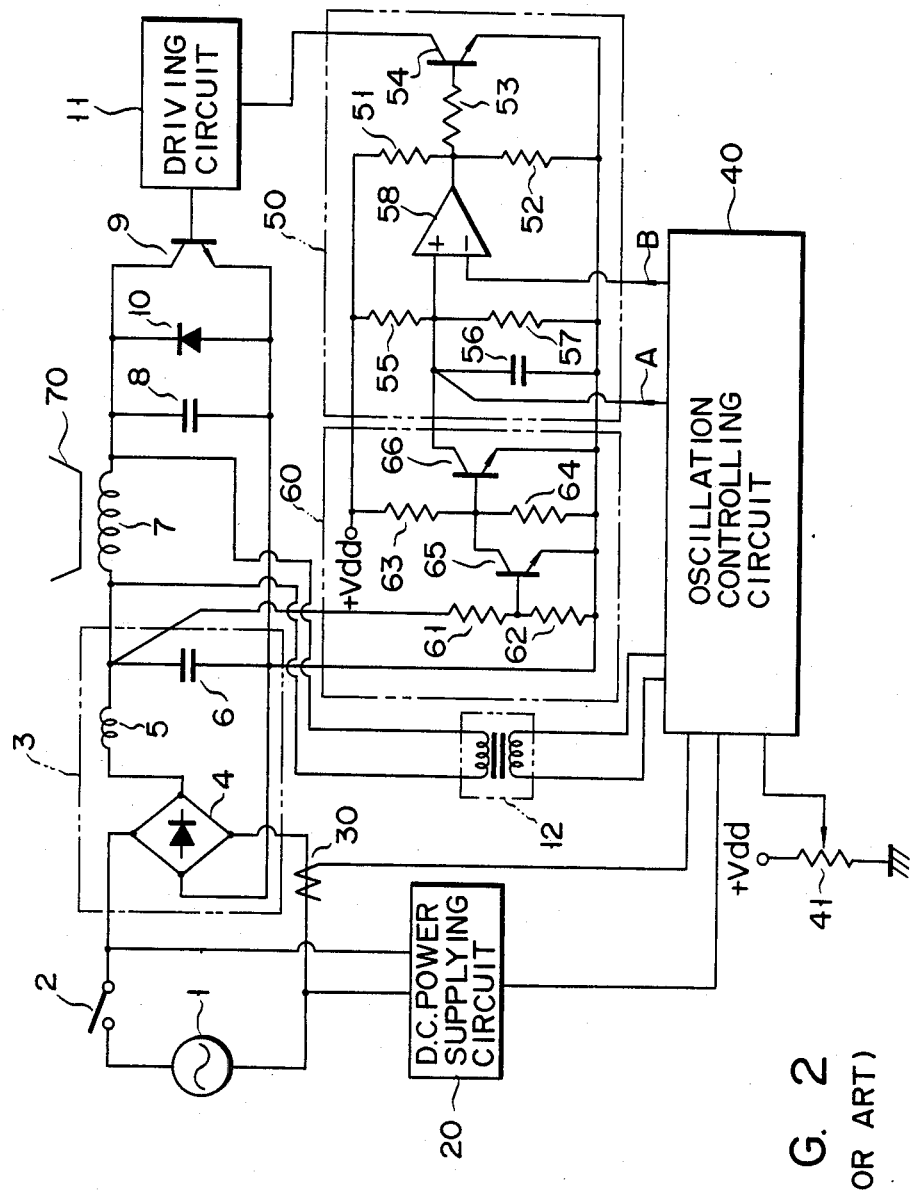
FIG. 2 is a diagram showing an arrangement of a conventional controlling circuit, enclosed in the main body of the apparatus shown in FIG. 1.
Figure 3:
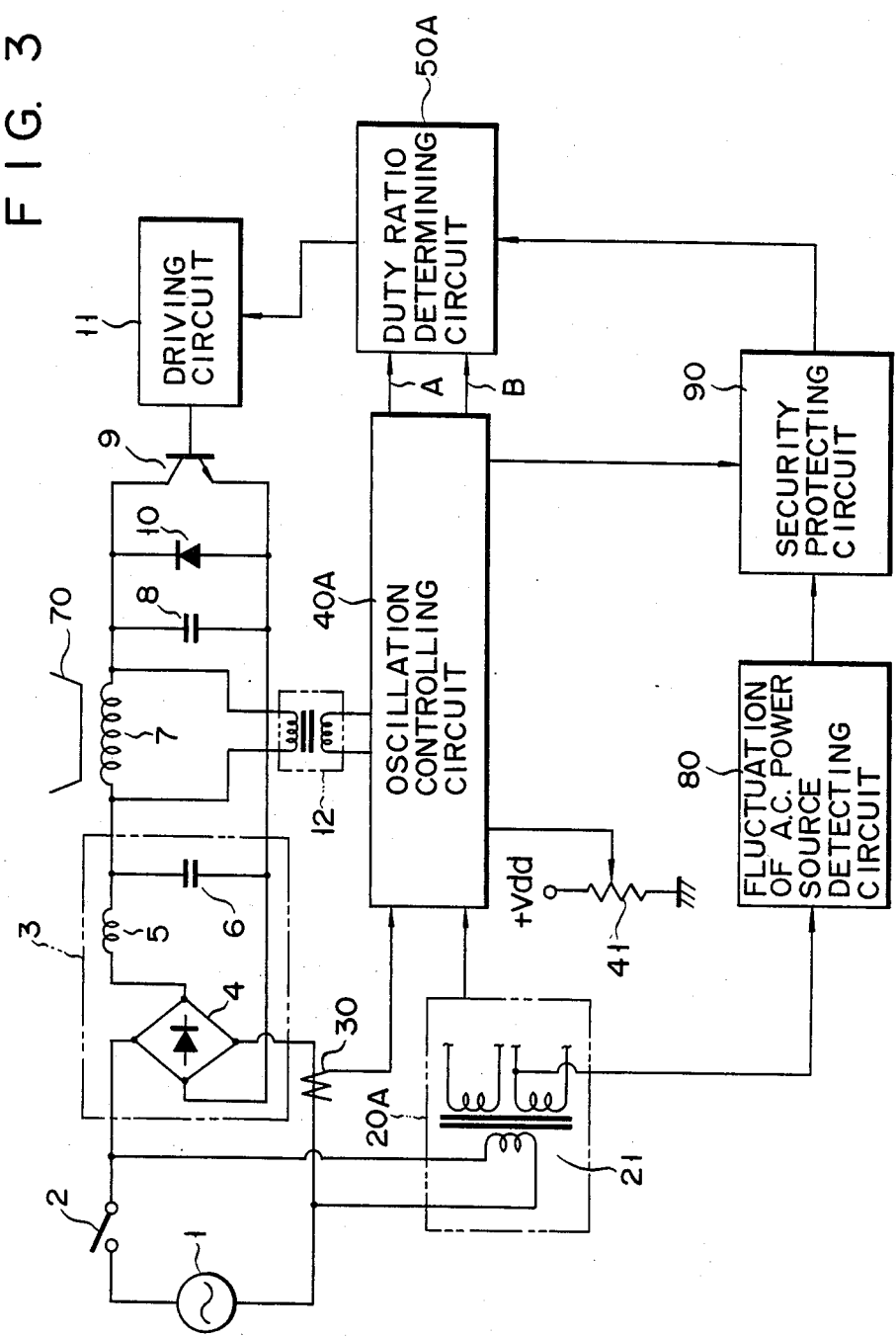
FIG. 3 is a diagram showing an arrangement of a controlling circuit of an induction heating cooking apparatus employed as one embodiment of an induction heating apparatus according to the present invention.
Figure 4:
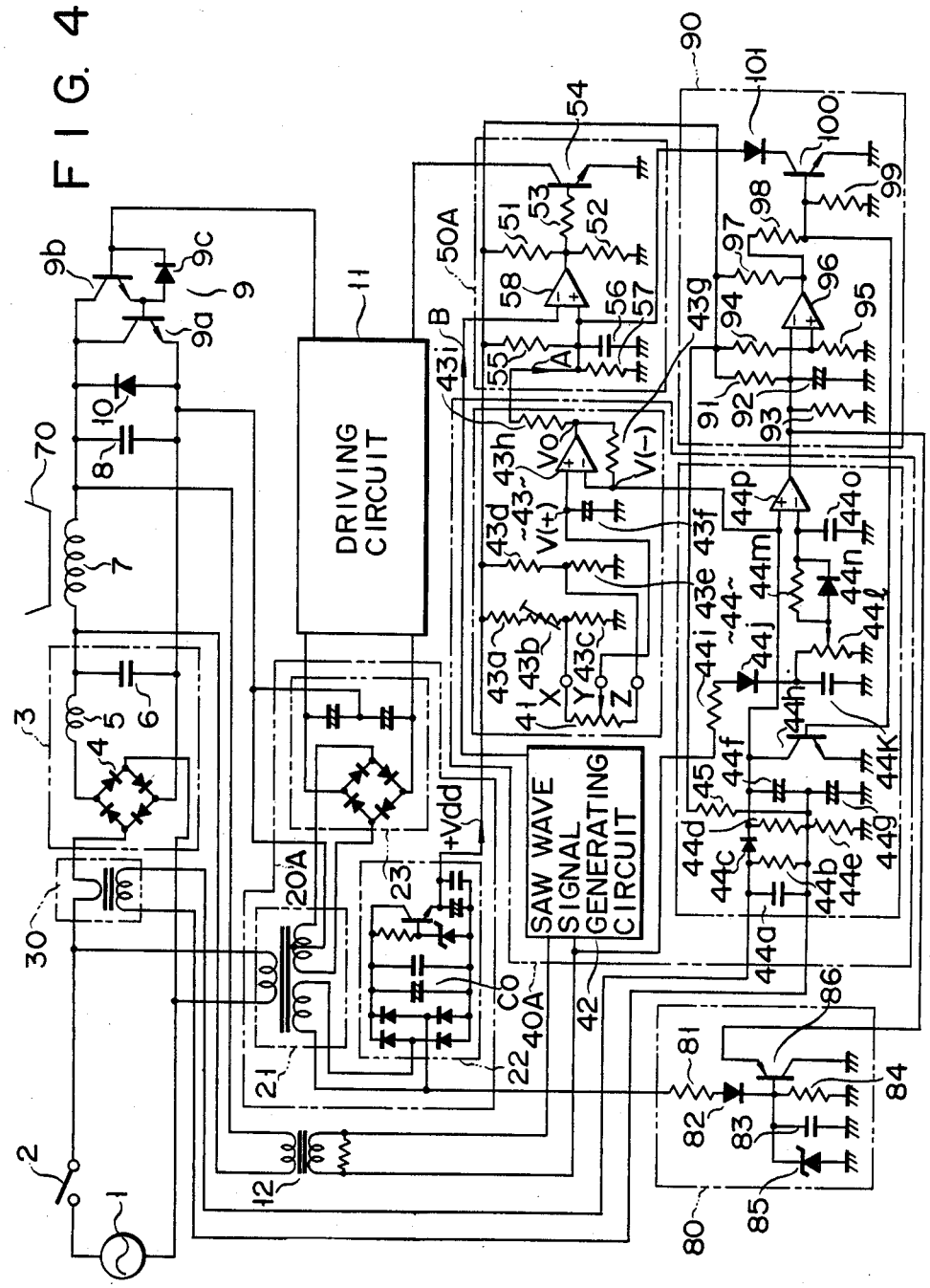
FIG. 4 is a diagram showing an arrangement of a practical example of FIG. 3.

One embodiment of the present invention applied to an induction heating cooking apparatus will now be described below with reference to FIGS. 3 and 4. In FIGS. 3 and 4, the same parts and components as those shown in FIGS. 1 and 2 described before are designated by the same reference numerals, and their detailed descriptions are omitted. A different point of different is that each arrangement of a circuit 80 for detecting a fluctuation in the AC power source, an oscillation controlling circuit 40A, an on-off duty ratio determining circuit 50A, and a DC power supplying circuit 20A differs, and a security protecting circuit 90 are newly provided.

First, in the controlling circuit as the induction heating cooking apparatus shown in FIG. 3, the secondary voltage of a transformer 21 in the DC power supplying circuit 20A is supplied to the circuit 80 for detecting a fluctuation in the AC power source. The detecting circuit 80 detects the voltage drop of the AC power source 1 due to the secondary voltage of the transformer 21. The result of detection of the detecting circuit 80 is supplied to the security protecting circuit 90. When the oscillation controlling circuit 40A determines that the load is improper as will be mentioned later and when the circuit 80 for detecting a fluctuation in the AC power source detects the power voltage drop, the security protecting circuit 90 controls the operation of the on-off duty ratio determining circuit 50A, respectively, thereby stopping the on-off driving of the transistor 9 by the driving circuit 11.

A practical arrangement of FIG. 3 is shown in FIG. 4.

As shown in FIG. 4, the voltage across the heating coil 7 is first extracting through the transformer 12 and supplied to the oscillation controlling circuit 40A. The transistor 9 actually comprises two transistors 9a and 9b, which are Darlington connected, and a diode 9c connected between the base-emitter of the transistor 9b. The DC power supplying circuit 20A comprises the transformer 21, a DC regulating circuit 22 and a rectifying circuit 23, and supplies the DC voltage +Vdd obtained from the DC regulating circuit 22 to the oscillation controlling circuit 40A, on-off duty ratio determining circuit 50A and security protecting circuit 90, respectively. As the same time, the DC power supplying circuit 20A supplies the DC voltage derived from the rectifying circuit 23 to the driving circuit 11. The oscillation controlling circuit 40A has a saw wave signal generating circuit 42, a heating power setting circuit 43 and a load detecting circuit 44. The saw wave signal generating circuit 42 outputs the saw wave signal B synchronized with the oscillation of the resonance circuit on the basis of the heating coil voltage extracted through the transformer 12. The heating power setting circuit 43 outputs the power setting signal A at the voltage level corresponding to the output of the power adjusting volume 41 and to the output of the current transformer 30. The load detecting circuit 44 detects the presence or absence and material of the pan 70 as the load on the basis of the output of the current transformer 30 and of the heating coil voltage extracted through the transformer 12. The results of this detection are supplied to the security protecting circuit 90.

The circuit 80 for detecting a fluctuation in the AC power source comprises: a capacitor 83 to which the secondary voltage of the transformer 21 for low voltage conversion in the DC power supplying circuit 20A is applied through a resistor 81 and a diode 82; a resistor 84 connected in parallel to the capacitor 83; a Zener diode 85 connected in parallel to the capacitor 83; and a pnp transistor 86 in which the voltage of the Zener diode 85 is applied between the base and collector. When it is assumed that the secondary voltage of the transformer 21 has dropped temporarily to, e.g., 0 V due to the voltage drop of the AC power source 1, the detecting circuit 80 allows the charges in the capacitor 83 to be discharged through the resistor 84 and causes the base potential of the transistor 86 to be made lower than the emitter potential, thereby turning on the transistor 86. In this case, as will be mentioned later, for instance, even if the power switch 2 is repeatedly turned on and off many times, namely, every time the power voltage fluctuates, the transistor 86 will be immediately turned off due to the charging time constant (T1) defined by the resistor 81 and capacitor 83. This does not matter, owning to the charging time constant (T4) defined by a resistor 91 and a capacitor 92 which is charged when the transistor 86 is turned off.

On the other hand, the security protecting circuit 90 comprises: a series member of a resistor 91 and a capacitor 92 to which the DC voltage +Vdd is applied; a resistor 93 connected in parallel to the capacitor 92; a series circuit of resistors 94 and 95 to which the DC voltage +Vdd is applied; a comparator (operational amplifier) 96 in which the voltage developed at a mutual connecting point of the resistors 91 and 93 and capacitor 92 is applied to an inverting input terminal (−), and the voltage generated at a mutual connecting point of the resistors 94 and 95 is applied to a non-inverting input terminal (+), and both of these voltages are compared; a resistor 97 connected between the line of the DC voltage +Vdd and an output terminal of the comparator 96; a series of resistors 98 and 99 to which the voltage developed at a mutual connecting point of the output terminal of the comparator 96 and the resistor 97 is applied; an npn transistor 100 whose base-emitter is connected to the resistor 99; and a diode 101 connected between the collector of the transistor 100 and the non-inverting input terminal (+) of the comparator 58 in the on-off duty ratio determining circuit 50A. The mutual connecting point of the resistors 91 and 93 and capacitor 92 is connected to an output terminal of the load detecting circuit 44, which will be explained later, and to the emitter of the transistor 86 in the circuit 80 for detecting a fluctuation in the AC power source.

The operation in the arrangement as described above will now be schematically explained.

The pan 70 is placed on the top plate 16 (refer to FIG. 1), and the power switch 2 is turned on. Then, the power setting signal A and saw wave signal B are output from the oscillation controlling circuit 40A, so that the transistor 54 in the on-off duty ratio determining circuit 50A is turned on or off. The driving circuit 11 turns the transistor 9 on or off in response to that on-off operation and the inverter circuit is made operative, thereby allowing a high frequency current to flow through the heating coil 7. In this case, if the pan 70 is not put on the plate or if the material of pan 70 is improper even when it is put thereon, such an abnormality will be detected by the load detecting circuit 44, and the output of the load detecting circuit 44 becomes logic "0". At this time, a discharge path of the capacitor 92 is formed in the security protecting circuit 90, so that the output of the comparator 96 becomes logic "1". When the output of the comparator 96 becomes logic "1", the transistor 100 is turned on and the voltage at the non-inverting input terminal of the comparator 58 in the on-off duty ratio determining circuit 50A becomes a zero level, so that the output of the comparator 58 becomes logic "0". Then the transistor 54 is turned off, and the driving circuit 11 stops the on-off driving of the transistor 9. Namely, the operation of the inverter circuit stops and the high frequency current does not flow through the heating coil 7.

When the pan 70 is securely placed and the material of the pan 70 is suitable, the output of the load detecting circuit 44 becomes logic "1," and the transistor 100 in the security protecting circuit 90 is turned off. When the transistor 100 is turned off, the transistor 54 in the on-off duty ratio determining circuit 50A is turned on or off. In response to that on-off operation, the driving circuit 11 continues the on-off driving of the transistor 9. In this way, the inverter circuit operates, and the high frequency magnetic field is generated from the heating coil 7, thereby allowing the cooking heat to be continue.

When the power voltage drops for some reason on this cooking heat, the secondary voltage of the transformer 21 in the DC power supplying circuit 20A drops in association of that voltage drop. The transistor 86 in the detecting circuit 80 is then immediately turned on, so that the output of the load detecting circuit 44 forcedly becomes logic "0". A discharge path of the capacitor 92 is formed in the security protecting circuit 90, and the output of the comparator 96 becomes logic "1". When the output of the comparator 96 becomes logic "1", the transistor 100 is turned on, and the voltage level at the non-inverting input terminal of the comparator 58 in the on-off duty ratio determining circuit 50A becomes zero, so that the output of the comparator 58 becomes logic "0". Then, the transistor 54 is turned off and the driving circuit 11 stops the on-off driving of the transistor 9. Namely, the operation of the inverter circuit stops, and the high frequency current does not flow through the heating coil 7.

Next, in considering the operation when the circuit 80 for detecting a fluctuation in the AC power source starts its operation and the operation when it detects the fluctuation in the AC power source, a practical example will be described in detail.

That is, by turning the power switch 2 on, the base voltage of the transistor 86 in the fluctuation detecting circuit 80 increases due to a time constant $T_1$ of the resistor 81 and capacitor 83. When the base voltage reaches the Zener voltage of the Zener diode 85, it is maintained at a constant voltage.

On the other hand, the emitter voltage of the transistor 86 is the same as the voltage at the inverting input terminal (−) of the comparator 96 in the security protecting circuit 90, and this voltage increases due to a time constant $T_2$ of the resistor 91 and capacitor 92. The emitter base of the transistor 86 is substantially equal to the state in which a forward diode is connected since the pnp transistor is used; consequently, the voltage which becomes stable at this time is nearly identical to the Zener voltage of the Zener diode 85. On one hand, the voltage at the non-inverting input terminal (+) of the comparator 96 is determined depending on a voltage dividing ratio of the resistors 94 and 95 and is set to be lower than the voltage at the inverting input terminal (−). Since the voltage at the inverting input terminal is higher than the voltage at the non-inverting input terminal in the normal operating state, the output of the comparator 96 becomes logic "0".

When the output of the comparator 96 becomes logic "0", the transistor 100 is turned off, and the power setting signal A is set with regard to the voltage at the non-inverting input terminal (+) of the comparator 58 in the on-off duty ratio determining circuit 50A. On the other hand, the saw wave signal B is input to the inverting input terminal (−) of the comparator 58, and the transistor 54 is turned on or off by the comparator 58. In response to that on-off operation, the driving circuit 11 on-off drives the transistor 9 and the inverter circuit is made operative, thereby allowing the high frequency current to flow through the heating coil 7.

In the case where the voltage of the power source 1 temporarily becomes, for example, 0 V in this state, or in the case where the switch 2 is turned off, the charges of the capacitor 83 in the circuit 80 for detecting a fluctuation in the AC power source are discharged due to the resistor 84 connected in parallel to the capacitor 83. A discharge time constant $T_3$ at this time is determined by the capacitor 83 and resistor 84. The emitter voltage of the transistor 86 is the voltage at the inverting input terminal of the security protecting circuit 90, and this voltage is determined by a discharge time constant $T_4$ of the capacitor 92 and resistor 93.

In order to turn on the transistor 86, it is necessary to reduce the base voltage of the transistor 86 sooner than the emitter voltage.

Namely, the discharge time constants are set to the relation of $T_3 < T_4$. Consequently, the voltage at the inverting input terminal of the comparator 96 drops to nearly 0 V since the charges of the capacitor 92 are discharged due to the turn-on of the transistor 86. On one hand, the voltage at the non-inverting input terminal of the comparator 96 is determined due to the decrease in DC voltage +Vdd. A capacitor $C_O$ having a relatively large capacity and the like is inserted in the DC regulating circuit 22 of the DC power supplying circuit 20A, thereby preventing the DC voltage +Vdd from suddenly dropping. Thus, the output of the comparator 96 becomes logic "1" since the voltage at the inverting input terminal (−) is low, so that the voltage can be applied to the base of the transistor 100, and the transistor 100 is turned on. When the transistor 100 is turned on, the voltage at the non-inverting input terminal of the comparator 58 in the on-off duty ratio determining circuit 50A becomes nearly 0 V, so that the output of the comparator 58 can become logic "0". Then, the transistor 54 is turned off, and the driving circuit 11 stops the on-off driving of the transistor 9. That is, the inverter circuit stops operating, so that the high frequency current will not flow through the heating coil 7.

On the other hand, where the voltage of the power source 1 is recovered to the inherent voltage, the transistor 86 in the circuit 80 for detecting a fluctuation in the AC power source is turned off when the base voltage of the transistor 86 becomes the Zener voltage of the Zener diode 85. Then, the voltage at the inverting input terminal of the comparator 96 in the security protecting circuit 90 increases due to the time constant $T_2$ of the resistor 91 and capacitor 92.

When this voltage becomes higher than the voltage divided by the resistors 94 and 95, the output of the comparator 96 becomes logic "0" and the transistor 100 is turned off, so that the voltage at the non-inverting input terminal of the comparator 58 in the on-off duty ratio determining circuit 50A can be increased to the power setting signal A. In addition, the saw wave signal B is input to the inverting input terminal of the comparator 58, and the transistor 54 is turned on or off by the comparator 58. In response to that on-off operation, the driving circuit 11 on-off drives the transistor 9, and the inverter circuit is made operative, thereby allowing the high frequency current to flow through the heating coil 7.

As described above, where the voltage of the power source 1 varies, a determination with regard to whether the transistor 9 is made operative or inoperative is made due to the operations of the fluctuation detecting circuit 80 and of the comparator 96 in the security protecting circuit 90. In this embodiment, each value of parts and components is set as follows: the resistor 81 is 220 ohms (Ω); the capacitor 83 is 0.1 micro-farad (μF); the resistor 84 is 330 kilo-ohms (kΩ); The Zener voltage of the Zener diode 85 is 5.6 volts (V); the resistor 91 in the security protecting circuit 90 is 56 kilo-ohms (kΩ); the resistor 93 is 820 kilo-ohms (kΩ); the capacitor 92 is 33 micro-farads (μF); the resistor 94 is 6.8 kilo-ohms (kΩ); the resistor 95 is 3.9 kilo-ohms (kΩ); and the DC voltage +Vdd is 10 volts (V).

Therefore, the discharge is performed at the discharge time constant $T_3$:

$$T_3 = \epsilon^{(-\frac{T}{C \times R})} = \epsilon^{(-\frac{T}{0.1 \times 10^{-6} \times 330 \times 10^3})}$$

(where C is a capacity of the capacitor 83 and R is a resistance value of the resistor 84). Also, the discharge is carried out at the discharge time constant $T_4$:

$$T_4 = \epsilon^{(-\frac{T}{C \times R})} = \epsilon^{(-\frac{T}{33 \times 10^{-6} \times 820 \times 10^3})}$$

(where C is a capacity of the capacitor 92 and R is a resistance value of the resistor 93). That is, we will have:

$$T_3 = \epsilon^{(-\frac{T}{0.033})} \text{ and } T_4 = \epsilon^{(-\frac{T}{27.06})}.$$

For instance, assuming that the time duration of power failure is 0.05 seconds (i.e., T=0.05), $T_3$ and $T_4$ will have the following values:

$$T_3 = \epsilon^{(-\frac{0.05}{0.033})} = 0.22, \text{ and } T_4 = \epsilon^{(-\frac{0.05}{27.06})} = 0.998.$$

That is, the base voltage of the transistor 86 becomes the Zener voltage of the Zener diode 85, i.e., 5.6 V×0.22=1.23 V, while the emitter voltage becomes 5.6 V×0.998=5.59 V. On one hand, since the transistor 86 is turned on when the potential difference between the emitter and base becomes 1 V or more, the potential difference (5.59−1.23=4.36 V) between the emitter and base in this case is enough value to turn on the transistor 86.

The foregoing power setting circuit 43 will now be described in detail. This power setting circuit 43 serves to determine the voltage level of the power setting signal A of the on-off duty ratio determining circuit 50A. In the power setting circuit 43, one end of the power adjusting volume 41 is connected to a connecting point of resistors 43b and 43c of a series member of resistors 43a, 43b and 43c to which the DC voltage Vdd is applied. The series member of these resistors 43a, 43b and 43c serves to determine the maximum value of the high frequency current flowing through the heating coil 7.

One end of the power adjusting volume 41 is connected to a connecting point of a series member of resistors 43d and 43e to which the DC voltage Vdd is applied. The series member of these resistors 43d and 43e serves to determine the minimum value of the high frequency current flowing through the heating coil 7.

As a slidable contact Y of the power adjusting volume 41 approaches point X, the high frequency current flowing through the heating coil 7 increases. On the contrary, as the contact Y approaches point Z, the high frequency current decreases. The slidable contact Y is connected to a non-inverting input terminal of a comparator 43h. When the slidable contact Y of the power adjusting volume 41 rapidly changes, a capacitor 43f serves to prevent the noise and to reduce the rapid change of the voltage. The AC input current detected by the current transformer 30 is converted to the DC voltage through a diode 44c of the load detecting circuit 44 mentioned later, and this DC voltage is fed back to an inverting input terminal of the comparator 43h. In the case where the AC input current is larger than the voltage which was set by the power adjusting volume 41, it is inverted and amplified by the comparator 43h, thereby preventing the AC input current from becoming larger than the set current.

The foregoing load detecting circuit 44 will now be described in detail. That is, the AC input current detected by the current transformer 30 is converted to the DC voltage by the load detecting circuit 44. A capacitor 44a and a resistor 44b are connected in parallel to the secondary side of the current transformer 30. One end of the secondary side of the current transformer 30 is connected to a capacitor 44g, which is connected in parallel to a resistor 44e. One end of the resistor 44e and one end of the capacitor 44g are grounded. The AC current supplied to the parallel member of the capacitor 44a and resistor 44b, is rectified through a diode 44c. The output side of the diode 44c is connected to a parallel member of a resistor 44d and a capacitor 44f. This rectified output is connected to a non-inverting input terminal (+) of a comparator 44p and to an inverting input terminal (−) of the comparator 43h in the power setting circuit 43. In addition, this rectified output is connected to the collector of a transistor 44h whose emitter is grounded.

On the other hand, the voltage generated by the heating coil 7 is detected by the transformer 12. One end of the secondary side of the transformer 12 is connected to a parallel member of a capacitor 44k and a trimming resistor 44l through a series member of a resistor 44i and a diode 44j. The output of the slidable terminal of the trimming resistor 44l is connected to an inverting input terminal (−) of the comparator 44p through a connecting point of a parallel member of a resistor 44m and a diode 44n and a grounding capacitor 44o connected to the output of this parallel member.

In the above-mentioned arrangement, when the pan 70 is put on the top plate 16 and the power switch 2 is turned on as mentioned before, the oscillation controlling circuit 40, on-off duty ratio determining circuit 50A and driving circuit 11 are made operative, so that the transistor 9 is turned on or off, thereby allowing the high frequency current to flow through the heating coil 7.

In this case, the voltage at the slidable terminal of the trimming resistor 44l is preset such that the output voltage on the secondary side from the current transformer 30 becomes lower than the voltage of the heating coil 7. For instance, when the pan 70 is removed from over the top plate 16 in such a state, the impedance of the heating coil 7 becomes small and a large current flows through the heating coil 7. The voltage of the heating coil 7 increases in this state. Thus, the voltage of the heating coil 7 becomes higher than the output voltage from the current transformer 30 and becomes higher than the voltage set by the trimming resistor 44l. Those voltages are compared by the comparator 44p. Therefore, the output of the comparator 44p becomes logic "0," and the charges of the capacitor 92 in the security protecting circuit 90 are discharged. Therefore, when the voltage at the inverting input terminal (−) of the comparator 96 becomes lower than the voltage at the non-inverting input terminal, the output of the comparator 96 becomes logic "1", so that the transistor 100 can be turned on. When the transistor 100 is turned on, the voltage at the non-inverting input terminal (+) of the comparator 58 in the on-off duty ratio determining circuit 50A becomes nearly 0 V, so that the output of the comparator 58 will become logic "0," the transistor 54 will turn off, and the driving circuit 11 will stop operating. Further, the transistor 9 is turned off, thereby stopping the operation of the inverting circuit.

When the oscillation stops and the voltage of the heating coil 7 becomes 0 V as a result, the voltage at the inverting input terminal (−) of the comparator 44p in the load detecting circuit 44 becomes higher than the voltage at the non-inverting input terminal (+) and the output of the comparator 44p becomes logic "1", so that the voltage at the inverting input terminal (−) of the comparator 96 in the security protecting circuit 90 can be increased due to the charge time constant of the capacitor 92 connected in series to the resistor 91. When the voltage at the inverting input terminal (−) increases and becomes higher than the voltage at the non-inverting input terminal (+), the output of the comparator 96 becomes logic "0", so that the transistor 100 will turn off. Then, the voltage of the non-inverting input terminal (+) of the comparator 58 in the on-off duty ratio determining circuit 50A increases due to the charge time constant of the resistor 55 and capacitor 56. This voltage is compared with the signal at the inverting input terminal (−) of the comparator 58. The on-off signal is output from the comparator 58, thus causing thus transistor 54 to be turned on or off. In response to that on-off operation, the driving circuit 11 is turned on or off, thereby allowing the transistor 9 to be turned on or off and permitting the high frequency current to flow through the heating coil 7. Unless the pan 70 exists on the top plate 16, the voltage of the heating coil 7 will increase as mentioned above, and the output of the comparator 44p in the load detecting circuit 44 will become logic "0", thereby stopping the operation of the transistor 9. As described above, in the load detecting circuit 44, a discrimination is made by the comparator 44p to see if the voltage of the heating coil 7 is high or low, thereby determining whether the operation is stopped or not.

Therefore, when the power voltage drops for some reason such as in the case where the user erroneously turns off the power switch 2 and immediately turns it on again during the cooking operation, where a defective contact of the power plug 19b occurs, or where an instantaneous power failure of the power source itself occurs, etc., the on-off driving of the transistor 9 is immediately stopped and the operation of the inverter circuit is stopped, so that the unstable operation of the inverter circuit can be prevented.

On the other hand, even in the case where the user repeatedly performs the on-off operations of the power switch 2 many times or where the power voltage repeatedly fluctuates for a long time due to a defective contact of the power plug or the like, every time the transistor 86 is turned off, the capacitor 92 is charged through the resistor 92 in the security protection circuit 90, and the transistor 100 is maintained in the on state until after the charging voltage reaches a predetermined value. Therefore, the on-off driving of the transistor 9 is stopped and the operation of the inverter circuit is stopped. Thus, the unstable operation of the inverter circuit can be prevented. In particular, when the power voltage repeatedly fluctuates for a long time, the DC power supplying circuit 20A cannot hold the operating voltage of the oscillation controlling circuit 40A, so the operation itself of the oscillation controlling circuit 40A as the main part of the control, in turn, becomes unstable. However, the on-off driving of the transistor 9 is immediately stopped even in such a situation; consequently, it is possible to prevent the breakage of component parts of the inverter circuit including the transistor 9. Further, since the problem of breakage is eliminated, parts having low withstanding voltages may be satisfactorily used as the component parts of the inverter circuit, which results in reduced cost.

Moreover, since the circuit 80 for detecting a fluctuation in the AC power source and security protecting circuit 90 as low voltage circuits are arranged on the low voltage side through the DC power supplying circuit 20A, the high voltage circuits such as the inverter circuit and the low voltage circuits are completely separated. Therefore, even if a part of the high voltage circuit is broken, this trouble will not affect the parts of the circuit on the low voltage side.

In the foregoing embodiment, the fluctuation in the AC power voltage is detected by detecting the voltage on the secondary side of the transformer 21 in the DC power supplying circuit 20A. However, it is also possible to detect the magnetic field developed in the transformer 21 or in the lead wire thereof by, e.g., a current transformer or hall device and thereby to detect the fluctuation in the AC power voltage due to a change in the intensity of the magnetic field detected.

The present invention is not limited to the foregoing embodiment, but various changes and modifications which are obvious to a person skilled in the art to which the invention pertains are deemed to lie within the spirit and scope of the invention.

As described above, according to the present invention, it is possible to provide an induction heating apparatus, including an induction heating cooking apparatus, in which the unstable operation of the control circuit, including the inverter circuit, can be prevented when the power voltage fluctuates, and breakage of parts of the control circuit, including the inverter circuit, can be also prevented, thereby achieving excellent safety and reliability.

What is claimed is:

1. An induction heating apparatus, which operates using power from an AC power source comprising:
   an AC power supply line having one end connected to the AC power source;
   rectifying means, connected to the other end of said AC power supply line, for rectifying a supplied AC voltage applied from the AC power source to a DC voltage output;
   inverter means for converting the DC voltage output from said rectifying means into a high-frequency output;
   heating coil means coupled to said inverter means for receiving said high-frequency output and for generating a high-frequency alternating magnetic field therefrom, induction heating of a load being performed by said alternating magnetic field;
   voltage converting means coupled to said other end of said AC power supply line for converting the AC voltage supplied from the AC power source to a converted AC voltage;
   voltage fluctuation detecting means, coupled to said voltage converting means, for receiving the converted AC voltage and for detecting variations in the level of the supplied AC voltage in accordance with the converted AC voltage, and providing a detection signal based on the converted AC voltage which assumes one state when the supplied AC voltage falls below a first predetermined threshold and assumes a second state upon lapse of a predetermined period after the supplied AC voltage rises above a second predetermined threshold; and
   control means, coupled to said voltage fluctuation detecting means, for receiving the detection signal and providing a control signal which stops said inverter means for a period equal to the duration of said detection signal in said one state thereby protecting the induction heating apparatus against power interruption.

2. An apparatus according to claim 1, wherein said voltage converting means comprises a transformer included in an auxiliary power source circuit for driving said inverter means.

3. An apparatus according to claim 1, wherein said voltage fluctuation detecting means comprises a first time constant circuit which is discharged with a first time constant when said converted AC voltage falls and is charged with a second time constant which is smaller than the first time constant when said converted AC voltage is restored, a second time constant circuit which is discharged with a third time constant greater than the first time constant when said low AC voltage falls and is charged with a fourth time constant which is greater than the second time constant when said low AC voltage is restored, and a transistor having a base coupled to said first time constant circuit and a collector coupled to a reference potential point, and said control circuit includes a comparator for comparing an output of said second time constant circuit and a reference voltage.

* * * * *